(12) United States Patent
Yamada (10) Patent No.: US 6,289,142 B1
(45) Date of Patent: Sep. 11, 2001

(54) OPTICAL PULSE GENERATOR

(75) Inventor: Koji Yamada, Tokyo (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 0 days.

(21) Appl. No.: 09/006,618

(22) Filed: Jan. 13, 1998

(30) Foreign Application Priority Data

Jan. 16, 1997 (JP) .................................... 9-005139

(51) Int. Cl.[7] ....................................... G02F 1/01
(52) U.S. Cl. .................... 385/1; 385/2; 385/3; 385/24; 385/31; 385/14; 385/129; 383/131; 383/132
(58) Field of Search .................... 385/1–3, 8, 9, 385/24, 31, 32, 38, 14, 129, 131, 132

(56) References Cited

U.S. PATENT DOCUMENTS

| 5,093,833 | 3/1992 | Pang et al. | 372/30 |
|---|---|---|---|
| 5,347,601 | * 9/1994 | Ade et al. | 385/3 |
| 5,434,693 | 7/1995 | Tanaka et al. | 359/180 |
| 5,550,855 | * 8/1996 | Aoyagi et al. | 372/50 |
| 5,724,464 | * 3/1998 | Kozuka | 385/31 |
| 5,886,807 | * 3/1999 | Cummings | 359/263 |

FOREIGN PATENT DOCUMENTS 6-281896  10/1994  (JP) .

OTHER PUBLICATIONS

Masatoshi Suzuki et al., Application of a λ/4–Shifted DFB Laser/Electroabsorption Modulator Monolithically Integrated Light Source to Single–Chip Pulse Generator with Variable Repetition Rate, Oct. 4, 1992, pp. 1129–1131.

"New applications of a Sinusoidally Driven InGaAsP Electroabsorption Modulator to In–Line Optical Gates with ASE Noise Reduction Effect", Masatoshi Suzuki et al., *Journal of Lightwave Technology*, vol. 111, No. 12, Dec., 1992.

* cited by examiner

Primary Examiner—Brian Healy
(74) Attorney, Agent, or Firm—Wenderoth, Lind & Ponack, L.L.P.

(57) ABSTRACT

An optical pulse generator of simple constitution being able to generate a pulse train formed of short optical pulses is provided. The optical pulse generator includes an optical modulator 10 which modulates the incident light on one end face 1a thereof and outputs the light modulated thereby from the other end face 1b thereof, and an optical phase adjuster 20 which is optically connected with the other end face 1b of the optical modulator 10, adjusts the phase of the modulated light from the other end face 1b, and again receives the modulated light of which the phase has been adjusted, through the other end face 1b.

12 Claims, 7 Drawing Sheets

OPTICAL PULSE GENERATOR

BACKGROUND OF THE INVENTION

The invention relates to an optical pulse generator, and more particularly relates to an optical pulse generator capable of generating short optical pulses.

The optical pulse generator for generating short optical pulses is necessary for structuring an optical communication system with ultra-high speed and large capacity.

Japanese laid-open patent publication JP A1-H6(1994)-281896 discloses an optical pulse generator which includes two optical modulators of the electroabsorption type which are made from semiconductors and are driven by the voltage of 0(V) or the forward bias voltage and the sinusoidal voltage (referred to as a electroabsorption type optical modulator hereinafter). This optical pulse generator generates optical pulses as follows. The incident light having a constant output level on the optical pulse generator is applied to the first electroabsorption type optical modulator to be modulated therein. Then, the output light from the first optical modulator is applied to the second electroabsorption type optical modulator which is driven by the bias voltage and another sinusoidal voltage which is derived from inverting the phase of the former sinusoidal voltage, so that a time difference is caused between the light modulated by the first and second electroabsorption type optical modulators, respectively, thereby generating short optical pulses having the repetitive frequency two times as high as the oscillation frequency of the sinusoidal voltage generator.

In the optical pulse generator of this type, when the electroabsorption type optical modulator is driven by the sinusoidal voltage, its optical output characteristic is non-linear, so that it can be operated as an optical gate of which the leading and trailing time is short.

In other words, if a value of the bias voltage is properly selected to be 0 (V) or other forward voltage, the time when the optical gate is kept completely opened, can be made more than a half of the repetitive oscillation period of the sinusoidal generator.

Also, the first and second electroabsorption type optical modulators operate as an optical gate, wherein the operational phase of the second modulator is made opposite to that of the first one. When a laser beam having a constant output level enters such first and second optical gates in sequence, the rising and falling portions of the laser pulse produced by the first gate are superposed only on the rising and falling portions of the laser pulse produced by the second gate, thereby enabling short optical pulse to be generated which has the frequency two times as high as the repetitive frequency.

Furthermore, the disclosure teaches that in the electroabsorption type optical pulse generator, the repetitive frequency may be arbitrarily changed by changing the frequency of the sinusoidal voltage generator.

However, the previous optical pulse generator contains the following problems. That is, the sinusoidal voltage has to be separately supplied to respective first and second electroabsorption type optical modulators. Consequently, in order to generate short optical pulses, the optical pulse generator is required to include at least two each of the DC voltage source and the sinusoidal modulation voltage source, a power divider for diving the sinusoidal modulation voltage into two, and an electric phase delay circuit. Therefore, this naturally results in enlargement of the generator scale.

In addition to the above problem, if it is intended to integrate the first and second electroabsorption type optical modulators on a substrate, two each of the high frequency feeder and the terminal resistance for impedance matching have to be disposed on the header for use in mounting elements thereon. This apparently causes various difficulties in design and manufacturer of such header.

In general, the length of the electroabsorption type optical modulator element might be about 300 $\mu$m or less. Even when two optical modulators are integrated on the same substrate, the total length of them might be about 700 $\mu$m or less. On one hand, in order to avoid having the two high frequency feeders make contact with each other, they would need a space or width of about 1 mm therebetween. Consequently, it is hardly possible to feed the high frequency in the identical direction. Even if it is tried to feed the high frequency in the opposite direction, it would become difficult to ensure the space for disposing the terminal resistance for impedance matching use.

Furthermore, alignment of the optical coupling has to be adjusted at two places, that is, one place is where the incident light enters and the other place is where the light comes out. When modularization is intended, there will be an number of steps for adjusting the alignment of the optical coupling between elements such as lenses. Moreover, a very tiny antireflection film has to be formed on both of the optical end faces of the modulator. This makes the manufacturing process more complex and difficult.

OBJECTS AND SUMMARY OF THE INVENTION

The present invention has been made to provide an optical pulse generator in which such problems as mentioned above has been obviated. According to the invention, there is provided an optical pulse generator, which includes an optical modulator of the light transmission type which modulates the light incident on one end face thereof and outputs the light modulated thereby from the other end face thereof; and an optical phase adjuster which is optically connected with the other end face of the optical modulator, adjusts the phase of the modulated light outputted from the other end face, and again receives the modulated light of which the phase has been adjusted, through the other end face thereof.

Furthermore, the invention provides an optical pulse generator, which includes an optical modulator having an optical modulation region for modulating the light incident on one end face thereof and a waveguide region for guiding the modulated light between the optical modulation region and the other end face thereof both regions being formed on an identical substrate; an optical antireflection film formed on one end face of the optical modulator; and an optical reflection film formed on the other end face of the optical modulator.

Still furthermore, the invention provides an optical pulse generator, which includes an optical modulator having an optical modulation region for modulating the light incident on one end face thereof and a waveguide region for guiding the modulated light between the optical modulation region and the other end face thereof, both regions being formed on an identical substrate; an adjustment electrode for use in impression of the bias voltage on the waveguide region of the optical modulator; an optical antireflection film formed on one end face of the optical modulator; and an optical reflection film formed on the other end face of the optical modulator.

In the optical pulse generator according to the invention, the modulated light is applied to the optical phase adjuster, by which the phase of the modulated light is adjusted. Then, this phase adjusted light is applied to the optical modulator. Then, the optical modulator modulates the returning modulated light and emits the short optical pulse which is produced by superposing the modulated light having received the above phase adjustment on the initially modulated light.

In the optical pulse generator of the invention, in which the optical modulator has an optical antireflection film formed at its one end face and an optical reflection film formed at other end face, the light modulated by the modulation region of the optical modulator propagates through the waveguide region provided on the same substrate. This modulated light reaches the reflection film and is then reflected thereby. The reflected light reversely propagates through the waveguide region by which its phase is adjusted depending on the optical length of the waveguide region. The phase adjusted light is applied to the optical modulator and is again modulated therethrough. Then, the optical modulator generates the short optical pulse which is produced by superposing the modulated light having received the above phase adjustment on the initially modulated light.

Furthermore, in the optical pulse generator of the invention, in which there is provided an adjustment electrode for use in impression of the bias voltage on the waveguide region of the optical modulator, the refractive index of the waveguide region is changed by applying the bias voltage thereon from this adjustment electrode. Thus, if the bias voltage is applied on the waveguide region at the time when the modulated light which is reflected by the reflection film and again passes through the waveguide region, it is possible to change the phase of that modulated light going back to the optical modulator. Therefore, the optical modulator generates the short optical pulse which is produced by superposing the modulated light of which the phase has been changed, on the initially modulated light.

BRIEF DESCRIPTION OF THE DRAWINGS

The above and other features of the invention and the concomitant advantages will be better understood and appreciated by persons skilled in the field to which the invention pertains in view of the following description given in conjunction with the accompanying drawings which illustrate preferred embodiments. In the drawings.

PREFERRED EMBODIMENTS OF INVENTION

Figure 1:
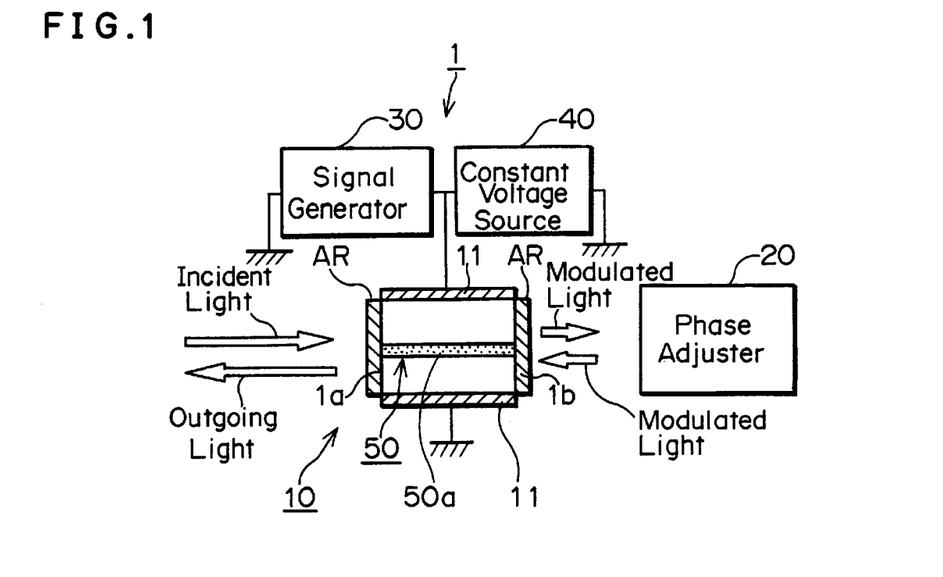
FIG. 1 is a diagram for explaining the constitution of the first embodiment according to the invention, FIGS. 2(a) and (b) are diagrams showing examples of a the constitution of phase adjuster.

The invention will now be described in detail with reference to the accompanying drawings, which are:

FIG. 1 is a block diagram illustrating the structure of the first embodiment according to the invention. This optical pulse generator includes an electroabsorption optical modulator 10, which modulates the light incident on the modulator through one end face 1a thereof and outputs the modulated light out of the other end face 1b thereof, and a phase adjuster 20 which is connected with the other end face 1b of the optical modulator 10 to adjust the phase of the modulated light from the optical modulator 10 and to return the phase adjusted light again to the other end face 1b of the optical modulator 10.

The optical pulse generator further includes a signal generator 30 which applies a periodically varying modulation signal (e.g. sinusoidal signal) on an electrode 11 of the optical modulator 10, and a constant voltage source 40 for the signal generator 30. Furthermore, an antireflection film AR is formed on each of the end faces 1a, 1b of the optical modulator 10.

Figure 2:
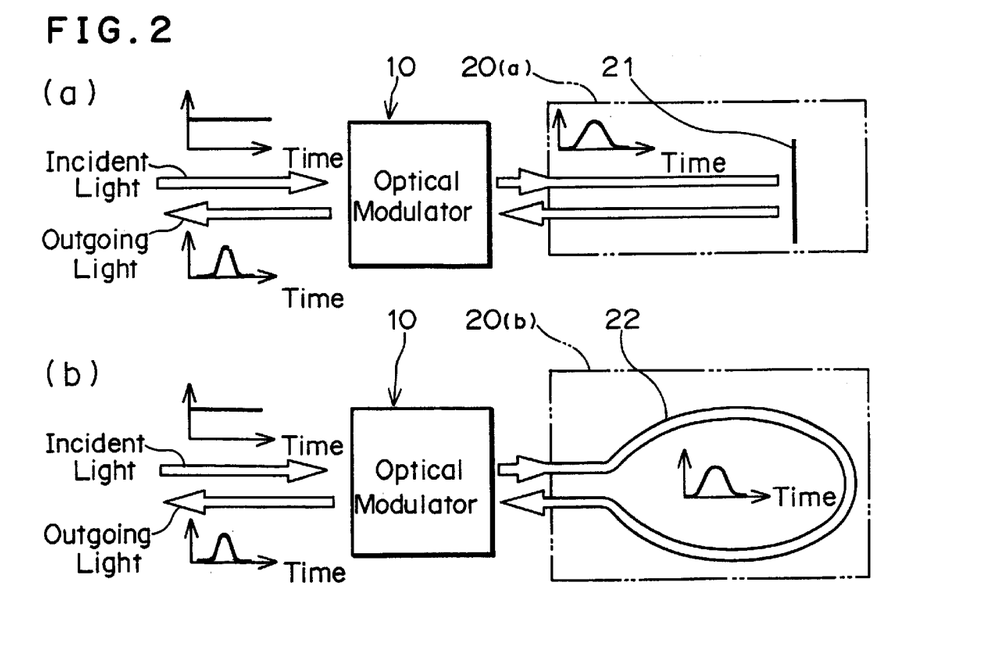

FIGS. 2(a)–(c) are diagrams showing some examples of the structure of the phase adjuster. FIG. 2(a) indicates an example in which the optical reflection is made use of while FIG. 2(b) shows an example in which an optical loop is utilized. That is, the example of the phase adjuster shown in FIG. 2(a) is constituted such that the modulated light from the optical modulator 10 is reflected by an optical reflection mirror 21 and is again returned to the optical modulator 10. The optical distance is adjusted depending on the position of the reflection mirror 21 by which the modulated light is reflected, thereby adjusting the phase of the modulated light coming back to the optical modulator 10.

In the example shown in FIG. 2(b), the phase adjuster is constituted such that the modulated light from the optical modulator 10 propagates through an optical loop 22 of the phase adjuster 20 and then comes back to the optical modulator 10. The optical distance is adjusted depending on the length of the optical loop 22, thereby adjusting the phase of the modulated light coming back to the optical modulator 10.

Figure 3:
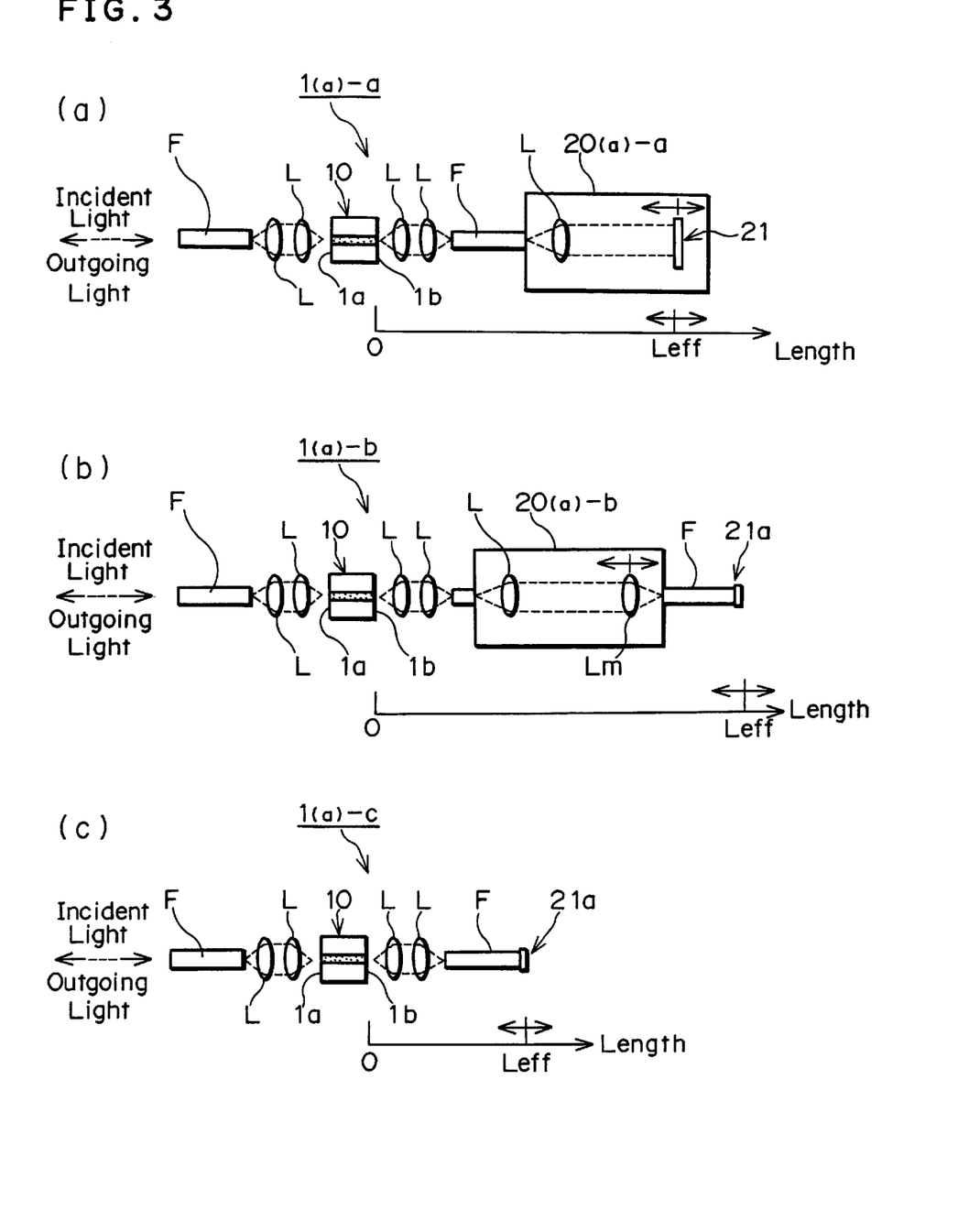
FIGS. 3(a)–(c) are diagrams showing the first concrete example of a phase adjuster.

FIGS. 3(a)–(c) shows some concrete examples of the phase adjuster which makes use of the optical reflection as shown in FIG. 2(a). In an example shown in FIG. 3(a), the phase adjuster is constituted such that the incident light enters the optical modulator 10 through an optical fiber F and lenses L, and the modulated light from the optical modulator 10 is inputted to the phase adjuster 20 through other lenses L and another optical fiber F. On one hand, inside of this phase adjuster 20, there are provided another lens L and the reflection mirror 21 of which the position is made variable. Thus, the phase difference of the modulated light reflected by the mirror can be set by adjusting the optical distance Leff from the output end of the optical modulator 10 to the reflection mirror 21.

In another example shown in FIG. 3(b), the phase adjuster 20a is constituted such that the modulated light coming from the optical modulator 10 enters an optical fiber F through the phase adjuster 20a and is reflected by an optical reflection film 21a (or reflection mirror) which is provided at the end of the optical fiber F, thereby returning the modulated light as reflected to the optical modulator 10. Thus, the phase difference of the modulated light as reflected can be set by adjusting the position of the lens L in the phase adjuster 20a, i.e. by adjusting the optical distance Leff from the output end of the optical modulator 10 to the reflection film 21a.

In still other example shown in FIG. 3(c), the phase adjuster is constituted such that the modulated light from the optical modulator 10 enters an optical fiber F and is then reflected by the reflection film 21a (or reflection mirror) which is provided at the end of the optical fiber F, thereby returning modulated light as reflected to the optical modulator 10. In this example, the length of the optical fiber having the reflection film 21a at its end is adjusted in advance, so that the phase difference of the modulated light reflected thereby can be set by adjusting the optical distance Leff from the output end of the optical modulator 10 to the reflection film 21a.

Figure 4:
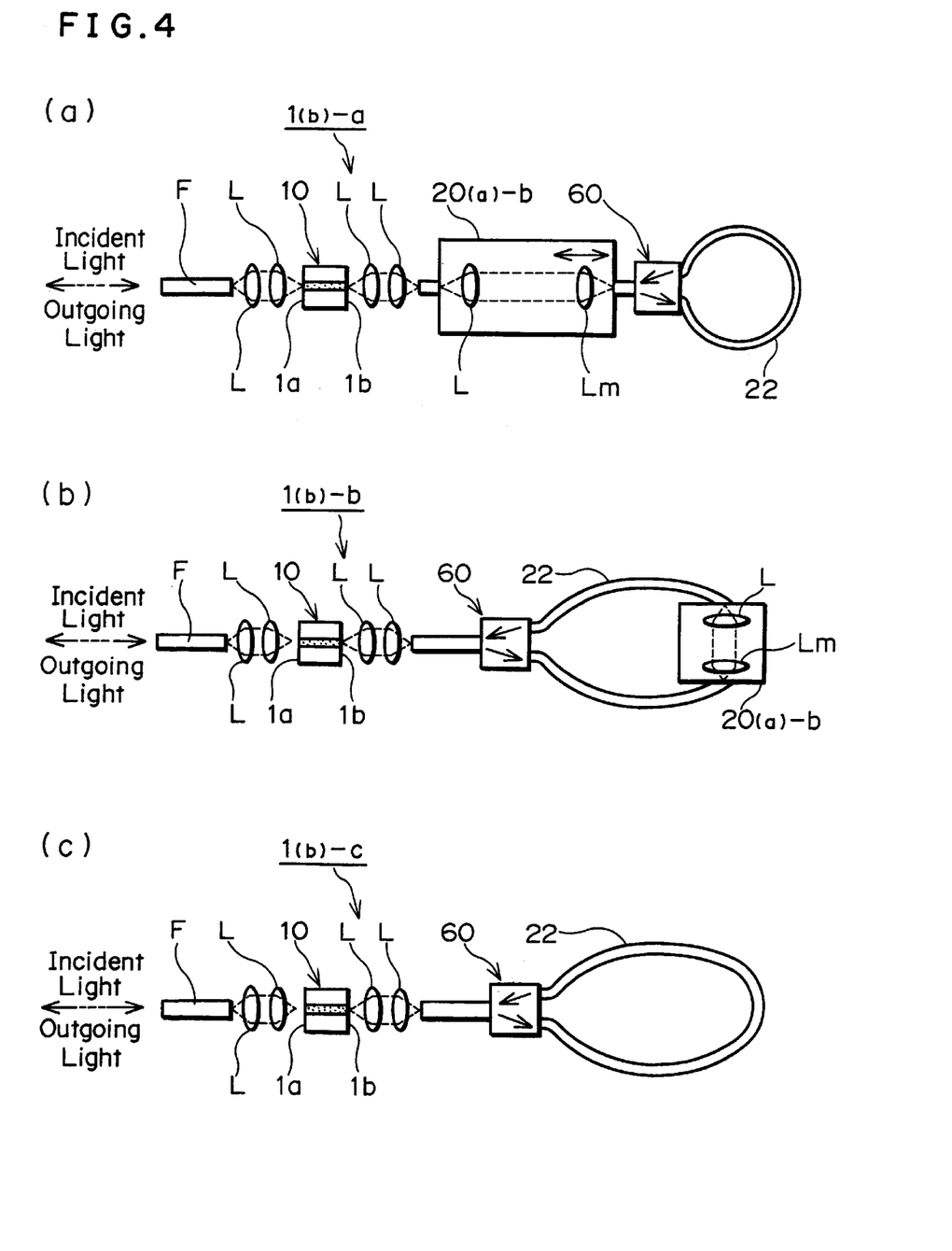
FIGS. 4(a)–(c) are diagrams showing the second concrete example of the phase adjuster.

FIGS. 4(a)–(c) shows some concrete examples of the phase adjuster making use of the optical loop as shown in FIG. 2(b). In an example shown in FIG. 4(a), the phase adjuster 20a is constituted such that the modulated light from the optical modulator 10 enters an optical circulator 60 through the phase adjuster 20a and is then returned to the optical circulator 60 after passing through an optical loop 22, thereby returning the modulated light, in which the phase difference is caused, to the optical modulator 10. The phase difference of the modulated light can be set by adjusting the optical distance Leff, i.e. the length of the optical path through which the modulated light propagates around i.e. from the output end of the optical modulator 10 to the same output end via the optical loop 22.

In another example shown in FIG. 4(b), the phase adjuster 20a is constituted such that the modulated light from the optical modulator 10 enters the optical circulator 60, from which the modulated light further enters the optical loop 22 including the phase adjuster 20a provided thereon. Then, the modulated light in which the phase difference is caused, is returned to the optical modulator 10.

In still another example shown in FIG. 4(c), the phase adjuster is constituted such that the modulated light from the optical modulator 10 enters the optical circulator 60, from which the modulated light further enters the optical loop 22 having a predetermined length. Then, the modulated light in which the phase difference is caused is returned to the optical modulator 10 after passing through the optical loop 22 and the optical circulator 60. In this example, since the length of the optical loop 22 can be adjusted in advance, the phase difference of the modulated light can be set by adjusting the optical distance i.e. the length of the optical path through which the modulated light propagates, i.e. from the output end of the optical modulator 10 to the same output end via the optical loop 22.

The constitution of the phase adjuster 20 should not be limited to the examples as described in the above. Any means can be used as the phase adjuster if it is able to adjust the optical distance, i.e. the length of the optical path through which the modulated light propagates, i.e. from the output end of the optical modulator 10 to its returning to the same output end, eventually.

In the next, it will be described how the optical pulse generator according to the first embodiment of the invention is operated. The incident light externally coming in the optical modulator 10 enters a waveguide through the anti-reflection film AR which is provided on one end face 1a of the optical modulator 10. This light propagates through the waveguide and is outputted out of the optical modulator 10 through another antireflection film AR which is provided on the other side face 1b of the optical modulator 10.

At this time, if the voltage applied on an optical absorption layer which is formed on a part of the waveguide, via an electrode 11, is forwardly biased with respect to the voltage $V_0$ at which the light extinction is initiated, almost all the light will pass through the optical modulator, while if the above voltage is reversely biased with respect to the voltage $V_0$, the light will be absorbed therein. This is indicated by the following expression (2) when using the following expression (1) with regard to the extinction ratio $E_R$, which is made experientially valid.

$$E_R = \exp[-\{(V-V_0)/V_{1/e}\}^n] \qquad (1)$$

$$P_{out}(V) = P_{in}\eta_1\eta_2\exp\{-\Gamma\alpha(0)L\}\exp[-\{(V-V_0)/V_{1/e}\}^n] \qquad (2)$$

where V: applied voltage, $V_0$: voltage initiating extinction, $V_{1/e}$: voltage at which the extinction ratio becomes 1/e, n: parameter indicative of non-linearity of extinction, $P_{in}$: optical power immediate before the light enters the end face of the optical modulator, $\Gamma$: optical confinement factor to the optical absorption layer in the waveguide mode inside the waveguide, $\eta_1$ and $\eta_2$: optical coupling coefficients at the input and output end faces of the light, respectively, $\alpha(0)$: light absorbing coefficient when no field strength is applied to the optical absorption layer, and L: length of the optical absorption layer along the waveguide.

Next, if the applied voltage V sinusoidally changes with respect to the time t, the voltage $V_{go}(t)$ inputted to the optical modulator 10 is represented by the following expression (3).

$$V_{go}(t) = V_b - A(\omega)V_r \cdot \cos(\omega t) \qquad (3)$$

where $V_b$: bias voltage, $A(\omega)$: response of the optical modulator at the angular frequency $\omega$, and $V_r$: amplitude of the applied voltage.

Figure 5:
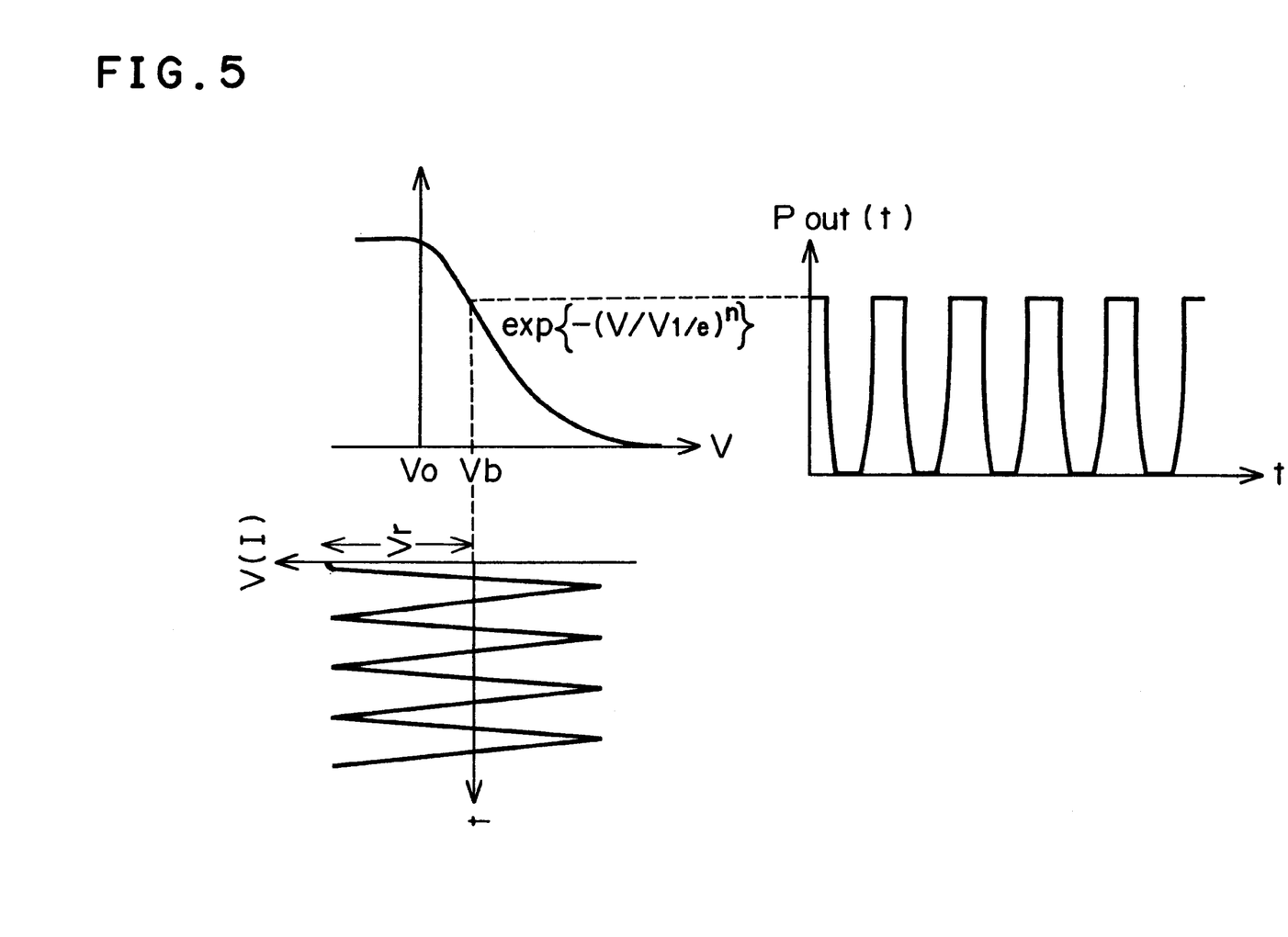
FIGS. 5, 6(a)–(c), and 7 are diagrams for explaining the operation of the first embodiment according to the invention.

As shown in FIG. 5, when the voltage V(t) is on the forward bias side with respect to the voltage $V_0$, the output from the optical modulator maintains a constant value. Contrary to this, when the voltage V(t) is on the reverse bias side, the output from the optical modulator attenuates depending on the bias voltage. Therefore, it become possible to control the time, during which the output from the optical modulator is kept constant, by means of adjusting the bias voltage $V_b$ and the amplitude voltage $V_r$.

FIG. 6(a) is a diagram showing a wave form model which is attained when substituting the applied voltage ($V_{go}$) expressed by the expression (3) for (V) of the expression (2). Accordingly, the modulated light represented by such a transmission function as shown in FIG. 6(a) can be obtained when the voltage of the sinusoidal wave form is applied to the optical modulator 10 shown in FIG. 1.

The modulated light passing through the optical modulator 10 once enters the phase adjuster 20, and again returns to the optical modulator 10 after passing through a predetermined optical path which is defined in the phase adjuster 20. The time $\Delta t$ which the modulated light takes until it returns to the optical modulator 10 is expressed by the following equation (4).

$$\Delta t = 2L_g/c_0 \qquad (4)$$

where $L_g$: optical distance taking account the refractive index of the path from the optical modulator to the reflecting mirror or reflecting film (in case of using the optical loop path, the optical distance taking account of the refractive index up to the middle point of the loop path), and $c_0$: light velocity.

When the modulated light starting from the optical modulator 10 again comes back to its optical source after passing through the phase adjuster 20, the optical phase of the coming back modulated light advances by the time $\Delta t$ which lapses before the modulated light comes back to its optical source, so that the applied voltage $V_{back}(t)$ to the coming back light is expressed by the following equation (5). That is:

$$V_{back}(t)=V_b-A(\omega)V_r{}^*\cos\{\omega(t+\Delta t)\} \quad (5)$$

The wave form shown in FIG. 6(b) can be obtained when the $\Delta t$ which satisfies the following expression (6) is used with the above expression (5).

$$\omega\Delta t=(2m-1)\pi[\text{rad.}] \quad (6)$$

where m=1, 2, 3, . . .

Consequently, the optical output which is finally obtainable from the optical modulator 10 can be expressed by the following expressing (7). That is:

$$P_{out}(V) = \quad (7)$$
$$P_{in}\eta_1^2\eta_2^2 \exp\{-\Gamma\alpha(0)L\}\exp\{-(V_{go}(t)/V_{1/e})^n\}\exp\{-V_{back}(t)/V_{1/e})^n\}$$

When taking out only the variation of the optical output with regard to the time, using the above expression, the following expression (8) can be obtained. That is:

$$\begin{aligned}E_R(t) &= \exp\{-((V_{go}(t)-V_0)/V_{1/e})^n\}\exp\{-(V_{back}(t)-V_0)/V_{1/e})^n\} \quad (8)\\ &= \exp[-\{((V_{go}(t)-V_0)/V_{1/e})\}^n - \{(V_{back}(t)-V_0)/V_{1/e})\}^n]\end{aligned}$$

FIG. 6(c) is a wave form diagram which is derived from the above expression (7).

Figure 7:
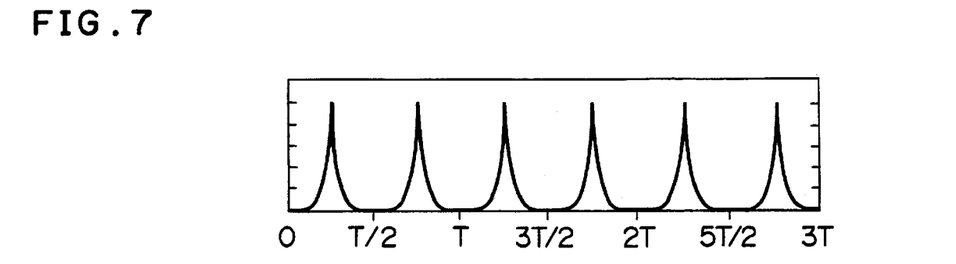

FIG. 7 is a diagram showing the wave form of the optical output which is obtained from the expression (7) under the condition, for instance $V_{1/e}=0.5(V)$, n=1, $V_0=V_b=0$, $V_r=3$ (V), and additionally, $\Delta t$ satisfies the expression (6).

As shown in FIG. 7, the optical pulse generator according to the first embodiment of the invention can generate an optical pulse train having a period which is a half of the repetitive period, i.e. the optical pulse train having a frequency which is two times as higher as the modulation frequency.

Figure 8:
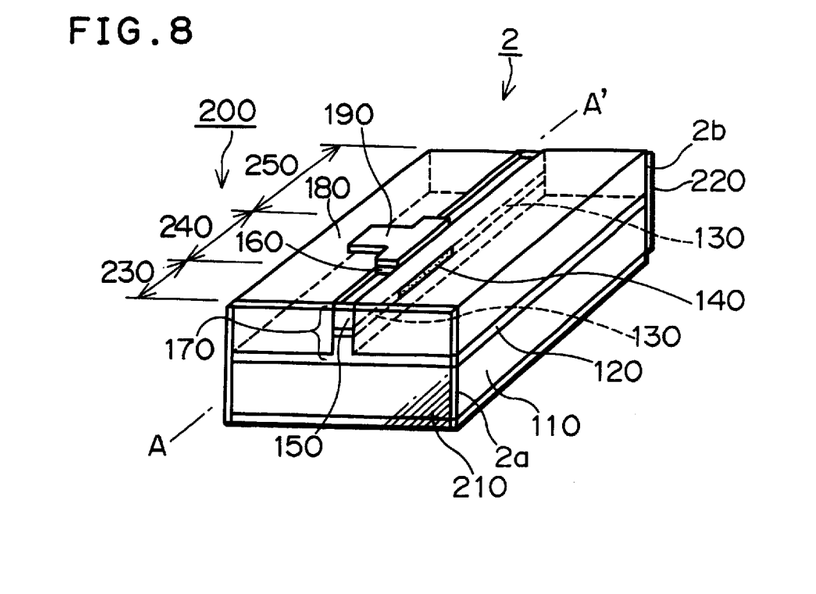
FIG. 8 is a schematic perspective view for explaining the second embodiment of the invention.

The optical pulse generator according to the second embodiment of the invention will be described next. FIG. 8 is a schematic perspective view for explaining the optical pulse generator according to the second embodiment of the invention. This optical pulse generator is characterized by an optical modulator 200 including an optical absorption region 240 which mainly operates to modulate the incident light on the optical modulator and a rear optical waveguide region 250 which is located on the downstream side of the above optical absorption region and operates to adjust the phase of the modulated light, both regions being integrally provided on a single identical substrate.

More specifically, in order to construct the optical modulator 200, there is first prepared a semiconductor substrate 110 of the first conductive type (e.g. n-type InP substrate). Then, there are stacked on this substrate a clad layer 120 of the first conductive type (e.g. n-type InP clad layer), an optical absorption layer 140 (e.g. undoped InGaAsP, PL peak wavelength: 1.47 μm), a clad layer 150 of the second conductive type (e.g. p-type InP clad layer), and an ohmic contact layer 160 (e.g. p-type InGaAs) in this order. After stacking the above elements, the stacked portion is removed in part by chemical etching so as to leave a predetermined stripe portion in the form of a mesa, which is used as a waveguide 170. Furthermore, both side spaces of this mesa type waveguide 170 are filled up with polyimide resin or the like to form burying layers 180.

In the same way, adjacent the front and rear sides of the optical absorption region 240, front and rear optical waveguide regions 230, 250 are formed by stacking on the semiconductor substrate of the first conductive type, a clad layer 120 of the first conductive type, an optical absorption layer 130 (e.g. undoped InGaAsP, PL peak wavelength: 1.30 μm), and a clad layer 150 of the second conductive type (e.g. p-type InP clad layer) in this order.

Furthermore, an electrode 190 is formed on the ohmic contact layer 160. An antireflection film 210 (e.g. SiOx) is formed on the end face of the front optical waveguide region 230 while a total reflection film (e.g. $Al_2O_3$/Au) is formed on the end face of the rear optical waveguide region 250.

In such an optical modulator 200 as constituted in the above manner, when the length of the optical absorption region 240 is nearly 260 μm, $V_{1/e}=0.5(V)$ and n=1 can be obtained as a concrete extinction characteristic.

Figure 9:
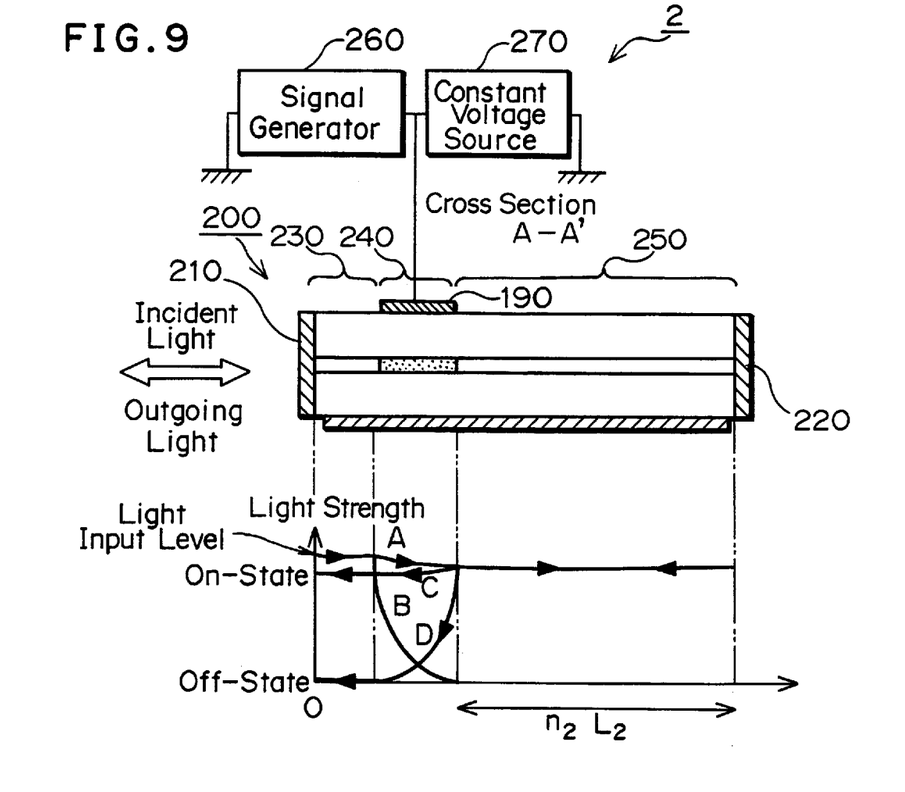
FIG. 9 is a diagram for explaining the operation of the second embodiment of the invention.

Next, it will be described how the optical pulse generator according to the second embodiment operates. FIG. 9 is a cross sectional view taken along A–A' line of FIG. 8 for explaining of the operation of the second embodiment and includes a diagram showing the change in the optical level.

The incident light onto the optical modulator 200 enters the optical waveguide thereof through the antireflection film 210 provided at the end face thereof. This light propagates through the front optical waveguide region 230, the optical absorption region 240, and the rear optical waveguide region 250. Then, it is reflected by the total reflection film 220 and goes back in the reverse direction along the path it first took.

Consequently, the incident light passes through the optical modulator 200 twice and goes outside through the antireflection film 210.

The lower part of FIG. 9 is a diagram showing the light strength distribution taken in the direction of the optical waveguide when the voltage is applied on the electrode 190 of the optical modulator 200. When no voltage is applied on the optical absorption region 240, the strength of the light having passed through the region 240 is indicated by a line A in FIG. 9. The strength of the light after having been reflected by the total reflection film 220, is indicated by a line C in FIG. 9, and the light in the on-state is output from the light modulator, with the strength C.

When enough voltage to extinct the light is applied on the optical absorption region 240, the strength of the light passing this region 240 is indicated by a line B in FIG. 9. The strength of the light again passing through the optical absorption region 240 after being reflected by the total reflection film 220 is in the off-state regardless of the applied voltage.

When the light which has initially passed through the optical absorption region 240 without applying any voltage thereon and has obtained the strength as shown by the line A, is reflected by the total reflection film 220 and again passes through the optical absorption region 240 on which the enough voltage is applied, the strength of the light is indicated by a line D in FIG. 9, and the light in the off-state is emitted from the light modulator, with the strength D.

Now, letting the length of the rear waveguide region 250 in the waveguide direction be $L_2$ and its refraction index be $n_2$, the optical distance $L_g$ of the expression (4) is expressed by the following expression (9). That is:

$$L_g=n_2L_2 \quad (9)$$

Figure 6:
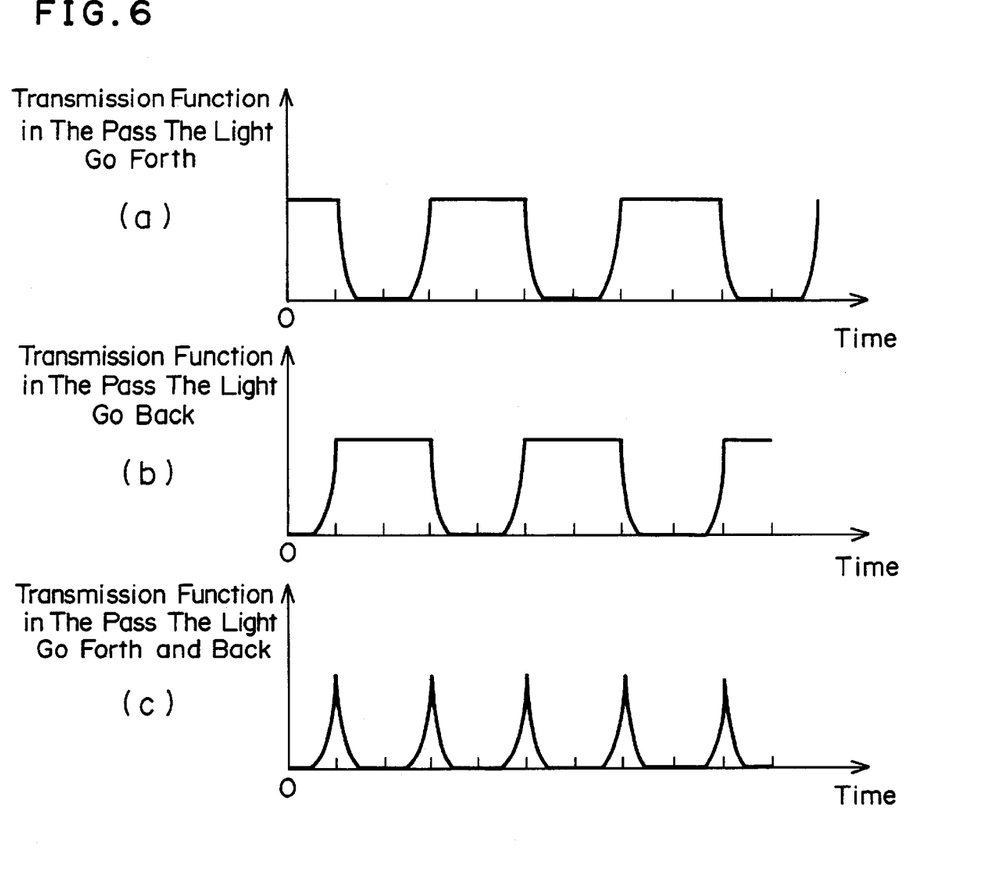

If the length $L_2$ of the rear waveguide region 250 is set so as to satisfy the following expression (10), it will be possible to obtain the wave form shown in FIG. 6.

$$L_2=c_0(2m-1)\pi/(2\omega n_2) \quad (10)$$

where m=1, 2, 3, . . .

In short, the light modulated by the optical absorption region 240 experiences a change in its phase depending on the length $L_2$ of the rear optical waveguide region 250 as set during the round-trip of this modulated light through the predetermined optical path, that is, optical absorption region 240-rear optical waveguide region 250-total reflection mirror 220-rear optical waveguide region 250-optical absorption region 240. Thus, naturally, a difference is caused in the phase of the modulated light before and after it makes the above round-trip. The modulated light which comes back to the optical absorption region 240 along with a phase difference, is again modulated by the optical absorption region 240 when it passes through the region 240, thereby making it possible to generate the short optical pulse having a repetitive frequency twice as high as the modulation frequency.

For instance, when performing the sinusoidal modulation at the frequency of 10 GHz, the time T in FIG. 7 is equivalent to 100 psec, so that an optical pulse train with the interval of 50 psec can be obtained.

Figure 10:
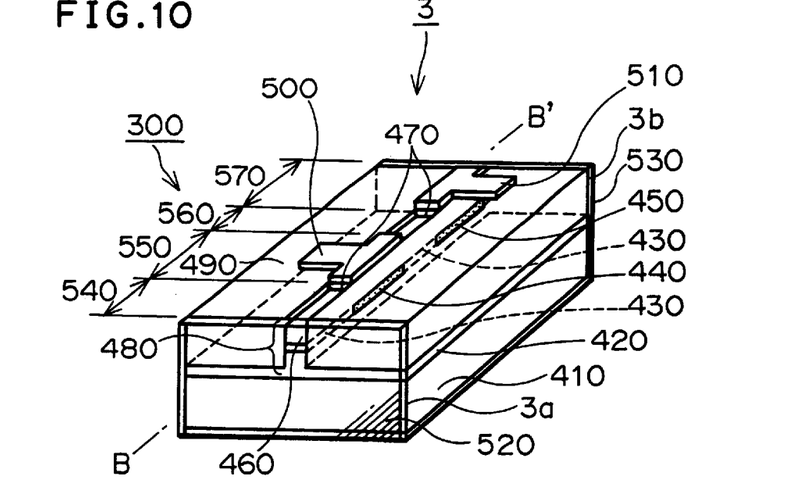
FIG. 10 is a schematic perspective view for explaining the third embodiment of the invention.

The optical pulse generator according to the third embodiment of the invention will be described in the next. FIG. 10 is a schematic perspective view for explaining the optical pulse generator according to the third embodiment. This optical pulse generator is characterized by an optical modulator 300 including an optical absorption region 550 which mainly operates to modulate the incident light on the optical modulator 300, and a rear optical waveguide region 570 which is located on the downstream side of the above optical absorption region and operates to adjust the phase difference of the modulated light, both regions being integrally provided on an identical substrate.

More specifically, in order to construct the optical modulator 300, there is first prepared a semiconductor substrate 410 of the first conductive type (e.g. n-type InP substrate). Then, there are stacked on this substrate a clad layer 420 of the first conductive type (e.g. n-type InP clad layer), an optical absorption layer 440 (e.g. undoped InGaAsP, PL peak wavelength: 1.47 μm), a clad layer 460 of the second conductive type (e.g. p type-InP clad layer), and an ohmic contact layer 470 (e.g. p$^+$type-InGaAs), thereby forming an optical absorption region 550.

Furthermore, there are stacked on the semiconductor substrate 410 of the first conductive type the clad layer 420 of the first conductive type, an optical phase adjustment layer 450 (e.g. e.g. undoped InGaAsP, PL peak wavelength: 1.55 μm), the clad layer 460 of the second conductive type, and the ohmic contact layer 470, thereby forming a phase adjustment region 570.

Still further, the clad 420 of the first conductive type, a photoconductive layer 430 (e.g. undoped InGaAsP, PL peak wavelength: 1.30 μm), and the clad layer 460 of the second conductive type are stacked on the semiconductor substrate 410 of the first conductive type in such a manner that they are adjacent the front and rear sides of the optical absorption region 550, thereby a waveguide region 540 and a separation region 560 being formed on the front and back sides of the optical absorption region 550, respectively.

After stacking the above elements, the stacked portion is removed in part by chemical etching so as to leave a stripe portion in the form of a mesa in a predetermined position, thereby an optical waveguide structure 480. Both side spaces of this mesa type optical waveguide structure 480 are filled up with polyimide resin or the like to provide a burying layer 490.

Furthermore, an electrode 500 is formed for the optical absorption region 550 while an phase adjustment electrode 510 is formed for the phase adjustment region 570. An antireflection film 520 (e.g. SiOx) is formed on the end face of the optical waveguide region 540 while a total reflection film (e.g. Al$_2$O$_3$/Au) is formed on the end face of the phase adjustment region 570.

In such an optical modulator 300 as constituted in the above manner, when the length of the optical absorption region 550 is nearly 260 μm, $V_{1/e}$=0.5(V) and n=1 can be obtained as a concrete extinction characteristic.

Figure 11:
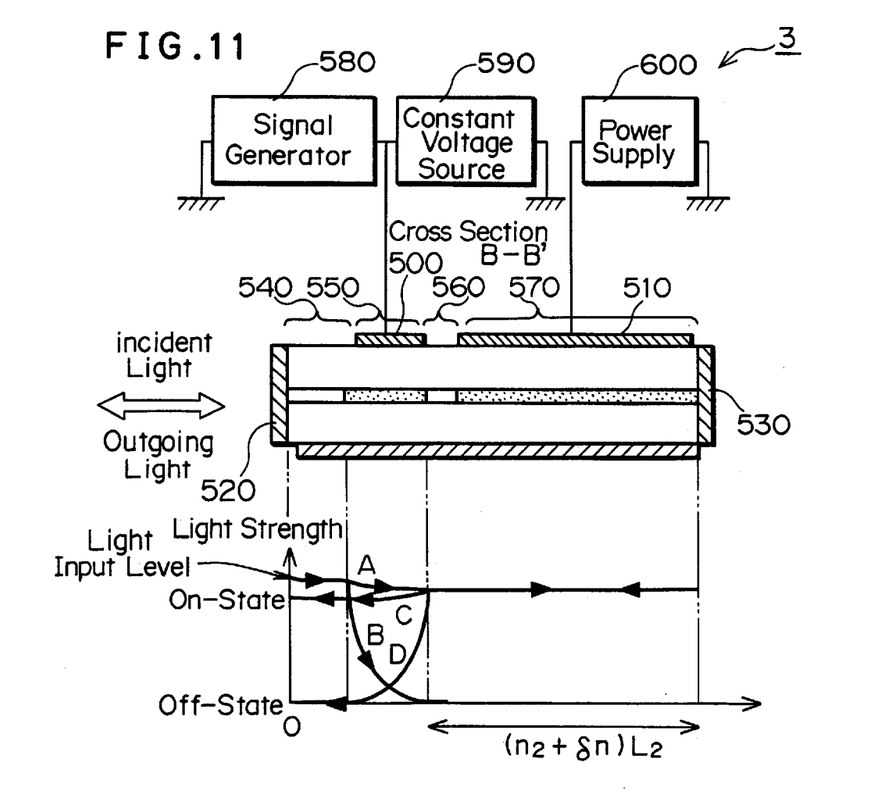
FIG. 11 is a diagram for explaining the operation of the third embodiment of the invention.

Next, it will be described how the optical pulse generator according to the third embodiment operates. FIG. 11 is a cross sectional view taken along B–B' line of FIG. 10, and is for explaining the operation of the third embodiment, and includes a diagram showing the change in the optical level in its lower part.

The incident light onto the optical modulator 300 enters in the optical waveguide thereof through the antireflection film 520 provided at the end face thereof. This light propagates through the optical waveguide region 540, the optical absorption region 550, the separation region 560, and the phase adjustment region 570. Then, it is reflected by the total reflection film 530 and goes back reversely along the optical path it first took.

Consequently, the incident light passes through the optical modulator 300 twice and goes out to the outside through the antireflection film 520.

The lower part of FIG. 11 is a diagram showing the light strength distribution taken in the direction of the optical waveguide at the time when the voltage is applied on the electrode 500 of the optical modulator 300. When no voltage is applied on the optical absorption region 550, the strength of the light having passed through the optical absorption region 550 is indicated by a line A in FIG. 11. The strength of the light after having been reflected by the total reflection film 530, is indicated by a line C in FIG. 11, and the light finally emitted from the light modulator is in the on-state, with the strength C.

When enough voltage to extinct the light is applied on the optical absorption region 550, the strength of the light having passed this region 550 is indicated by a line B in FIG. 11. The light passing again through the optical absorption region 550 after being reflected by the total reflection film 530 is in the off-state regardless of the voltage applied thereto.

When the light which has initially passed through the optical absorption region 550 without applying any voltage and has obtained the strength as shown by the line A, is reflected by the total reflection film 530 and again passes through the optical absorption region 550 on which the enough voltage is applied, the strength of the light is indicated by a line D in FIG. 11, and the light output from the optical modulator is in the off-state, with the strength D.

Furthermore, in the third embodiment of the invention, when the current I is injected to the phase adjustment region 570 by means of the phase adjustment electrode 510, the change in the refractive index is caused by the plasma effect to the optical phase adjustment layer 450 of the phase adjustment region 570, thereby enabling the optical distance $L_g$ of the expression (4) to be changed.

Now, letting the length of the phase adjustment region 570 be $L_2$, its refractive index be $n_2$, and change of refractive index be $\delta n(I)$, respectively, the optical distance $L_g$ of the expression (4) is expressed by the following expression (11). That is:

$$L_g = \{n_2 + \delta n(I)\} \cdot L_2 \quad (11)$$

If the length $L_2$ of the phase adjustment region 570 is set so as to satisfy the following expression (12) or (13), it will be possible to obtain the wave form shown in FIG. 6.

$$L_2 = c_0(2m-1)\pi/\{2\omega(n_2+\delta n(I))\} \quad (12)$$

where m=1, 2, 3, . . .

$$\delta n(I) = c_0(2m-1)\pi/(2\omega L_2) - n_2 \quad (13)$$

where m=1, 2, 3, . . .

In short, the refractive index of the phase adjustment region 570 is made variable by making use of the plasma effect which is caused by injecting the current I through the phase adjustment electrode 510, or by using the electro-optic effect which is caused by applying the reverse bias thereon. When the refractive index varies, the optical path length is changed in response thereto, so that there can be generated in the phase of the modulated light a difference responding to the varied refractive index. Accordingly, it is made possible to generate the short optical pulse having a repetitive frequency twice as high as the modulation frequency by again modulating the modulated light having the phase difference by the optical absorption region 550.

In the above-mentioned embodiments, the InP-semiconductor substrate is used for forming the optical modulator, but the other material (e.g. GaAs-semiconductor substrate) may be used for forming the optical modulator. Furthermore, it may be possible to use other layer structures (e.g. using quantum well structure for optical absorption layer, waveguide layer, optical phase adjustment layer, etc.), other waveguide structures (e.g. ridge waveguide etc.), and other electrode arrangement (e.g. disposing electrodes with different polarities on the identical plane) than these described above. It should be understood that the invention is not limited by the various values used in the course of describing the embodiments.

Furthermore, the antireflection film or the reflection film may function with regard to light having a specific wavelength, and they may be designed so as to reversely function such that they reflect or antireflect light having other wavelengths. Still further, the material of the reflection film and the antireflection film should not be limited to those mentioned above.

All the above embodiments are described referring to the case where the light strength is modulated. However, the invention may be applicable to other modulations of the light, for instance phase modulation, coding, gating, etc.

As described above, the following effects can be obtained by the optical pulse generator according to the invention. The optical pulse generator for generating short optical pulses can be realized by not using a plurality of optical modulators but using only a single optical modulator, so that only a single high frequency feeder is needed for operation, thus the generator being simplified.

In one optical modulator, the optical modulation region and the waveguide region for adjusting the phase of the light are integrally formed on a single identical substrate, so that variation in the light polarization is made minimal, thus enabling stable optical pulses to be obtained. Furthermore, as mentioned above, since the optical modulation region and the waveguide region are integrally formed on a single substrate, the adjustment of alignment over the optical coupling can be simplified and performed focusing only on one point, thus the number of steps of assembling and aligning the optical coupling means such as lenses (i.e. the number of optical parts and the time for assembling and aligning thereof) being fairly reduced in the modularization of the optical pulse generator.

Furthermore, such integration as described above can reduce or eliminate the parts constituting the optical coupling system, the parts possibly varying its optical characteristic depending on the change in the environmental condition and, thus the characteristic of the entire system being made less varied against the environmental change (e.g. temperature etc.), and reliability of the system being enhanced. Moreover, this integration makes it possible to locate the antireflection film only at one place. Therefore, the formation and installation of the antireflection film which requires precision control on its film thickness and refractive index, is made much easier, thereby its production yield and characteristic being highly improved and its quality being made much uniform.

In the structure according to the invention, the refractive indices of the optical modulation region and integrated waveguide region are made variable, so that the phase difference of the modulated light can be adjusted, thus enabling the optical pulse train to be obtained in response to the modulation frequency.

The entire disclosure of Japanese Patent Application No. 9-5139 filed on Jan. 16, 1997 including specification, claims, drawings and summary is incorporated herein by reference in its entirety.

What is claimed is:

1. An optical pulse generator, comprising:
    an optical modulator having a pair of end faces and comprising an optical modulation region operable to modulate light incident on one of said end faces and to output modulated light from the other of said end faces;
    an optical phase adjuster operable to adjust a phase of the modulated light outputted from the other of said end faces and to output the phase adjusted modulated light back to the other of said end faces; and
    an optical reflector, wherein said optical phase adjuster is operable to adjust an optical distance between said optical modulator and said optical reflector such that a product of time that the modulated light has taken to propagate from said optical modulator back to said optical modulator after being reflected by said optical reflector and an angular frequency of the modulation light applied on said optical modulator is an odd multiple of a phase corresponding to a half wavelength of the modulation light.

2. An optical pulse generator, comprising:
    an optical modulator having a pair of end faces and including an optical modulation region operable to modulate light incident on one of said end faces and a waveguide region operable to adjust a phase of the modulated light for return to said optical modulation region, wherein said optical modulation region and said waveguide region are formed on a single substrate;
    an optical antireflection film being formed on the one of said end faces of said optical modulator; and
    an optical reflection film being formed on the other of said end faces of said optical modulator and being operable to reflect the modulated light,
    wherein said waveguide region is operable to adjust an optical distance between said optical modulation region and said optical reflection film such that a product of time which the modulated light has taken to propagate from said optical modulation region to its return to said optical modulation region after being reflected by said optical reflection film and an angular frequency of the modulation light applied on said optical modulation region is an odd multiple of a phase corresponding to a half wavelength of the modulated light.

3. An optical pulse generator, comprising:
    an optical modulator having a pair of end faces and including an optical modulation region operable to modulate light incident on one of said end faces and a waveguide region operable to adjust a phase of the modulated light for return to said optical modulation region, wherein said optical modulation region and said waveguide region are formed on a single substrate;

an electrode operable to impress a bias voltage on said waveguide region of said optical modulator; and an optical reflection film being formed on the other of said end faces of said optical modulator and being operable to reflect the modulated light, wherein said electrode applies the bias voltage on said waveguide region to change a refractive index of said waveguide region such that a product of time which the modulated light has taken to propagate from said optical modulation region to its return to said optical modulation region after being reflected by said optical reflection film and an angular frequency of the modulation light applied on said optical modulation region is an odd multiple of a phase corresponding to a half wavelength of the modulation light.

4. An optical pulse generator claimed in claim 1, wherein said optical modulator is operable to modulate the light incident on the one of said end faces by an electroabsorption effect and to output the modulated light from the other of said end faces.

5. An optical pulse generator claimed in claim 4, wherein said electroabsorption effect changes periodically.

6. An optical pulse generator claimed in claim 5, wherein said optical modulator is driven by a modulation voltage which changes periodically to generate said electroabsorption effect which changes periodically.

7. An optical pulse generator claimed in claim 1, wherein said optical modulator further comprises an optical reflector which is operable to reflect the modulated light output from the other of said end faces to the one of said end faces.

8. An optical pulse generator, comprising:

an optical modulator having a pair of end faces and comprising an optical modulation region operable to modulate light incident on one of said end faces and to output modulated light from the other of said end faces;

an optical phase adjuster operable to adjust a phase of the modulated light outputted from the other of said end faces and to output the phase adjusted modulated light back to the other of said end faces; and an optical reflector, wherein said optical phase adjuster is operable to adjust an optical distance between said optical modulator and said optical reflector such that a product of time that the modulated light has taken to propagate from said optical modulator back to said optical modulator after being reflected by said optical reflector and an angular frequency of the modulation light applied on said optical modulator is an odd multiple of a phase corresponding to a half wavelength of the modulation light, wherein said optical modulator further comprises an optical loop which is operable to feedback the modulated light output from the other of said end faces to the one of said end faces.

9. An optical pulse generator claimed in claim 8, wherein said optical modulator is operable to modulate the light incident on the one of said end faces by an electroabsorption effect and to output the modulated light from the other of said end faces.

10. An optical pulse generator claimed in claim 9, wherein said electroabsorption effect changes periodically.

11. An optical pulse generator claimed in claim 10, wherein said optical modulator is driven by a modulation voltage which changes periodically to generate said electroabsorption effect which changes periodically.

12. An optical pulse generator as claimed in claim 2, wherein said waveguide region and said optical modulation region are formed in a waveguide path which is formed on said single substrate.

* * * * *